UNITED STATES PATENT OFFICE.

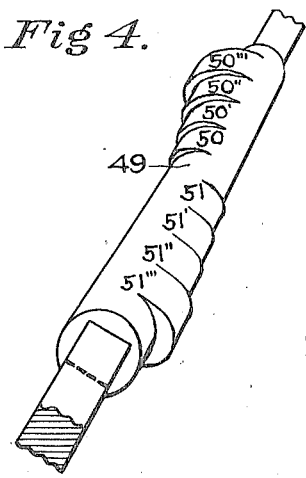
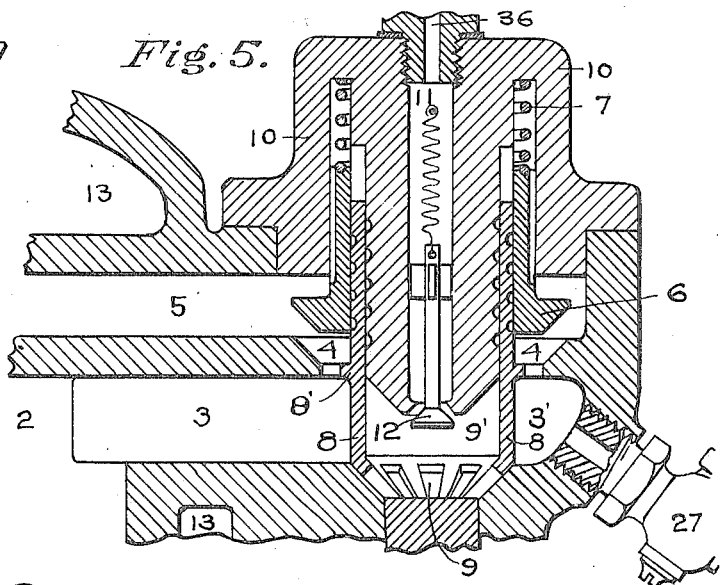

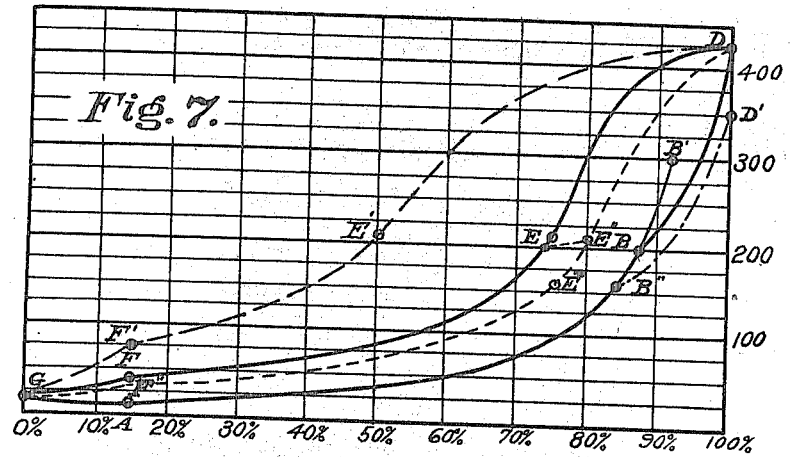
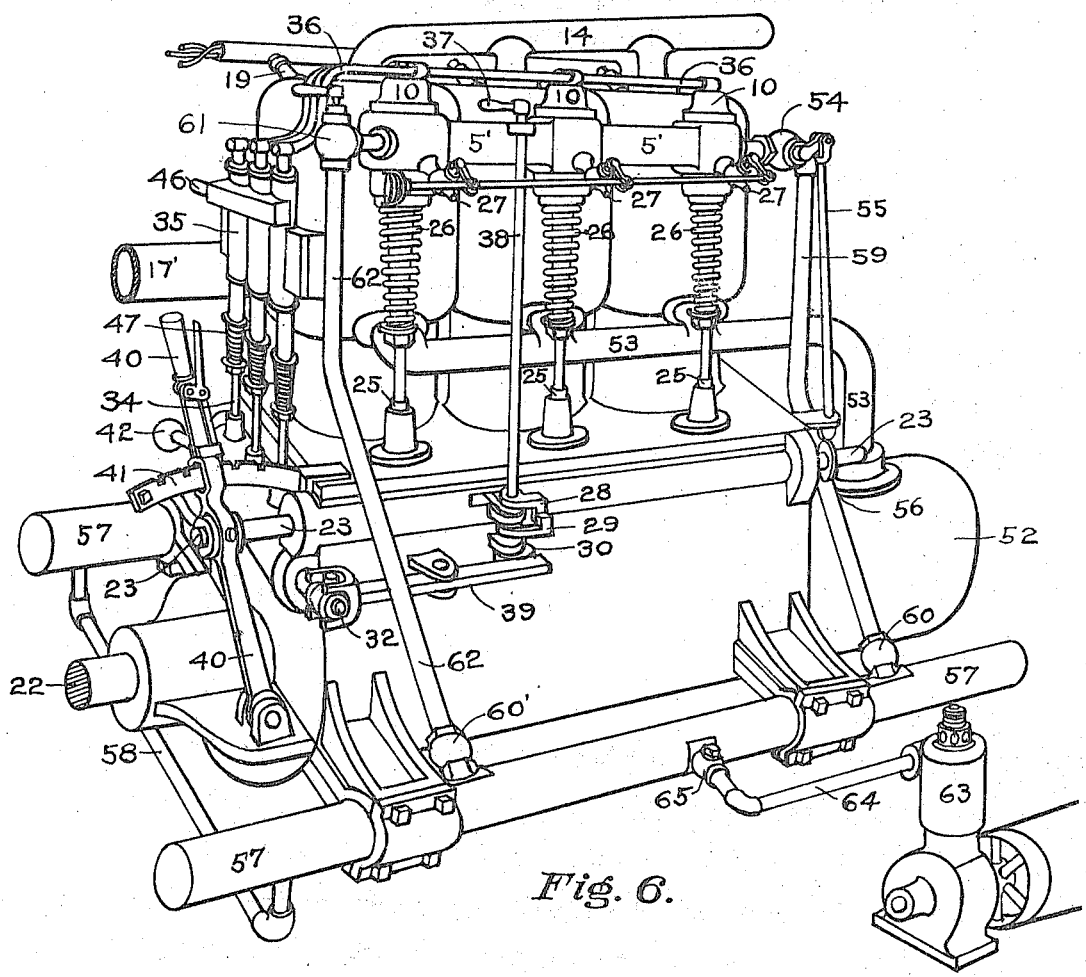

CHARLES D. McCLINTOCK, OF OAKLAND, CALIFORNIA, ASSIGNOR, BY DIRECT AND MESNE ASSIGNMENTS, TO McCLINTOCK ENGINE COMPANY, OF DETROIT, MICHIGAN, A CORPORATION OF DELAWARE.

INTERNAL-COMBUSTION ENGINE.

1,234,056.     Specification of Letters Patent.     Patented July 17, 1917.

Application filed July 16, 1912. Serial No. 709,628.

*To all whom it may concern:*

Be it known that I, CHARLES D. McCLINTOCK, a citizen of the United States of America, residing at Oakland, in the county of Alameda and State of California, have invented certain new and useful Improvements in Internal-Combustion Engines, of which the following is a specification, reference being had therein to the accompanying drawings.

My invention relates to that class of internal combustion engines in which combustion occurs upon the introduction of the fuel into the engine cylinder, the air for supporting combustion being previously highly compressed. The invention consists in the means employed for controlling the introduction and combustion of the fuel whereby this is proportionate to the displacement of the piston during the initial portion of the power stroke; further in the means for proportioning and intimately commingling the air and fuel so introduced; further in the means for maintaining the air and fuel, before introduction into the cylinder, under high pressure and subjected to the internal heat of the engine; further in the means for gasifying liquid fuel, where the latter is used, by the waste heat of the engine, and before the introduction of the charge into the engine cylinder; and further in various features of construction as hereinafter set forth.

The objects of my invention are to provide an engine which will operate under high pressures without danger of premature ignition of the fuel charge; which will increase thermal efficiency with consequent economy over that of existing methods; which will have a wide range of speed and be capable of close regulation; which will possess a greater starting torque and an increased overload capacity over existing engines, which will operate on any fuel gas or the gases obtained from the products of petroleum or from alcohol; which will be self-starting on its own gas mixture without the use of external means and which will be capable of reversing its direction of rotation with readiness and certainty.

I attain these objects by the mechanism shown in the accompanying drawings, in which—

Fig. 3 is a partial view of the end of the engine whereon the lay shaft operating the fuel pump is located and discloses means for regulating the quantity of fuel to be pumped to the gas valve.

Fig. 4 is a view in perspective of a form of double cam for operating the valves, whereby the engine may be caused to rotate in either direction.

Fig. 5 is an enlarged view of a form of chambered gas valve and an automatic air valve in their cage showing the position assumed during the last part of the compression stroke of the piston. It also shows the small check valve in the fuel line just closing after discharge of the fuel to the chamber of the gas valve.

Figure 1:
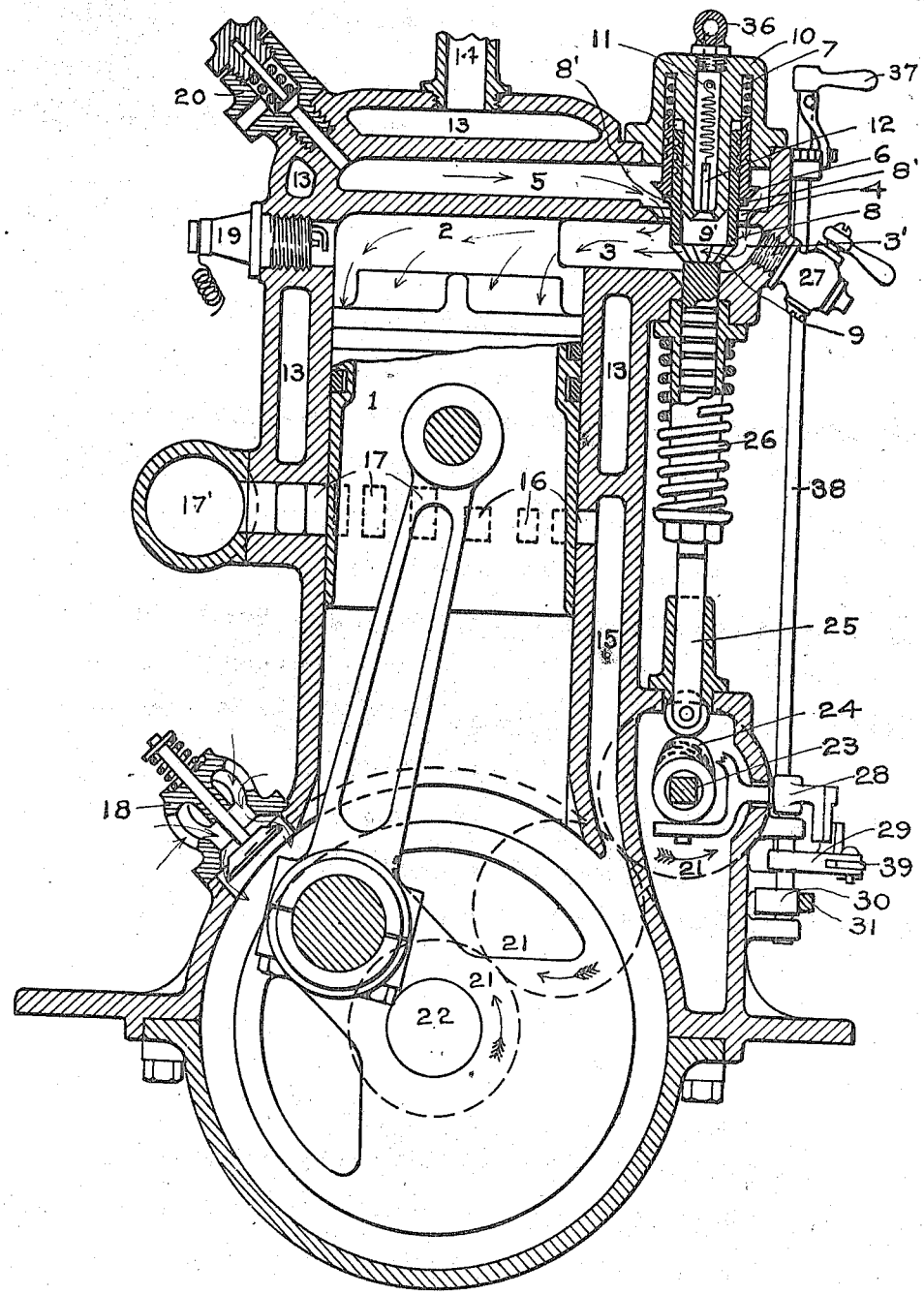
Figure 1 is a vertical section of my engine showing the position of the piston and the valves immediately after the beginning of the work stroke.

Fig. 6 is an outline view in perspective of a three-cylinder unit, showing the air receiver on the side of the cylinders instead of in the head as in Fig. 1. It also shows a form of positive blower or rotary pump attached to the shaft of the engine and a passage leading from said pump to each of the cylinders to supply the primary air for compression. It further shows storage tanks for air pumped by the pistons when the engine is turning over without the use of fuel as, for example, by its own momentum.

Fig. 7 is a characteristic diagram showing the different phases of the cycle of operation of the engine when worked on the so-called two-stroke plan.

In illustrating and describing the details of my invention I have selected a single cylinder engine, using crank case pre-compression and the two-stroke cycle for the principal figures in order to more clearly show the details of its working parts. It does not differ, however, in any of the essentials of this invention, from an engine of two or more cylinders, with primary air supplied from some source other than the crank case or from an engine working on the so-called four-stroke plan. The latter engine would dispense with the primary source of air supply and would substitute puppet valves for air inlet and burned gas exhaust as in common practice. The single cylinder engine obviously will not be self-starting or reversing unless its piston stops or is placed in the correct position: therefore, I have shown in Fig. 6, a type of multi-cylinder engine which embraces all of the features of my invention.

Both figures and letters are used to designate the different parts.

Figure 2:
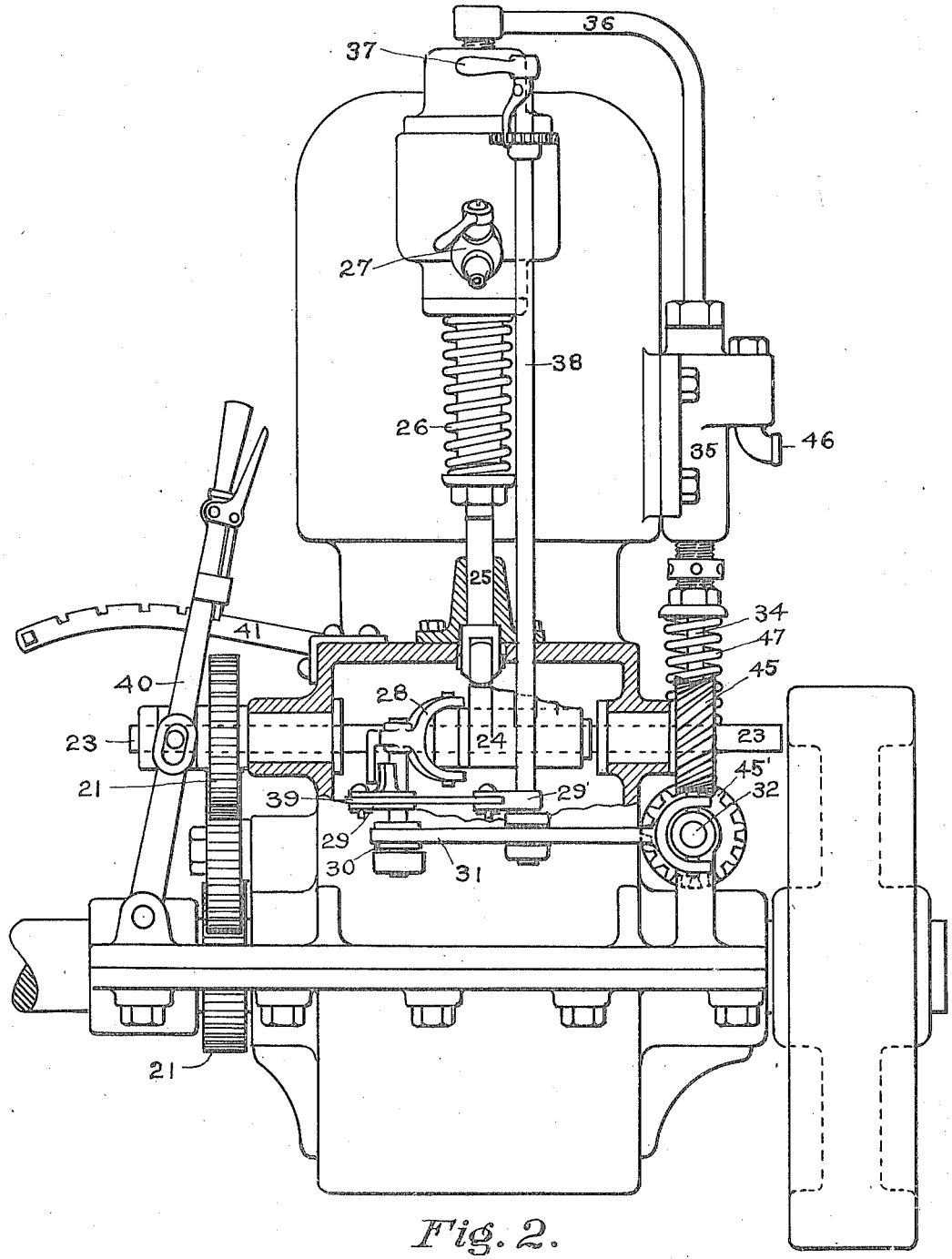
Fig. 2 is a sectional side view showing the location of the cam shaft and a form of stepped cam by means of which the valves are operated and means for sliding said cam shaft and cam axially to bring the successive steps of the cam into action on said valves.

1, in Fig. 1, is the piston; 2 is the combustion chamber; 3 is the cylinder part which, with the valve pocket 3′ and the valve opening 4, forms the connecting passage between the combustion chamber 2 and the receiver 5; 6 is the automatic air valve; 7 is its closing spring; 8 is the chambered gas valve; 8′ is a shoulder on the barrel of this valve by means of which the air valve 6 is lifted from its seat on the work stroke. (On the compression stroke the air valve 6 lifts automatically.) 9 indicates the gas ports in the gas valve; 9′ is the gas chamber; 10 is the valve cage containing these valves; 11 is the fuel chamber and 12 is the fuel check valve, both the latter being also in the valve cage 10; 13 indicates the usual water spaces of the engine; 14 is the water outlet; 15 is the passage through which the primary air enters the cylinder from the crank case; 16 are the inlet ports in the cylinder wall; 17 are the exhaust ports; 17′ the exhaust pipe; 18 the primary inlet valve to crank case; 19 is the spark plug; 20 is an adjustable safety valve; 21 is the timing gears through which rotary motion is transmitted from the engine shaft 22 to the squared cam shaft 23; 24 is the stepped cam which operates the tappet; 25 is the tappet which operates the gas valve 8; 26 is the spring for closing the gas valve; 27 is the relief cock for releasing air from the cylinders; 28 is a forked lever taking its motion from the axial movement of the cam shaft and by means of which through the short lever 29 and the cam 30, acting on the rocker arm 31, which slides the lay shaft 32 axially, the fuel cam 33 shown in Fig. 3 is caused to regulate the stroke of the pump plunger 34 of the fuel pump 35, which discharges its fuel supply through the pipe 36 to the fuel chamber 11; the fuel lever 37 and its shaft 38 shown in Figs. 1, 2, and 3, connect by means of the short lever 29′; the link 39 and the short lever 29 with the cam 30 and form a hand control of the fuel supply through the rocker arm 31 and connecting parts in the same manner as the forked lever 28, but entirely independent of that lever. The chief function of the forked lever 28 is to graduate the fuel supply according to the setting of the cam 24, and to positively shut off the supply when the cam 24 is moved to its neutral position, causing the gas valve 8 to cease operation.

The amount of this graduation is dependent on the fuel lever 37 and its connections, which limit the maximum amount of fuel to be used. This fuel lever also has the property of shutting off the fuel entirely and independently of the movement of the cam shaft 23, and its forked lever 28. 40 is the controller and is provided for sliding the shaft 23 lengthwise. Its setting determines the step of the cam 24 which will operate the gas valve 8 and thereby the lift of that valve and the time of its opening. When applied to the double cam shown in Fig. 4, it takes care of these settings for either direction of rotation of the engine, or by setting in the center of its notched sector 41, the neutral point of the cam is reached when both the gas valves 8 and the fuel pump 35 becomes inoperative. Another means of control of the fuel supply is found in the governor 42 which operates to move the lay shaft 32 with its fuel cam 33 independent of the other means. This is provided for limiting the speed of the engine which may be set at the desired speed by the adjusting nut 43 acting on the spring 44. 45 and 45′ are the gears used to transmit rotary motion from the cam shaft 23 to the lay shaft 32. 46 is the fuel inlet to the fuel pump 35; 47 is the spring which returns the fuel pump plunger 34 on its suction stroke, and 48 is a small handle attached to the fuel pump plunger 34 by means of which one or more strokes of the pump plunger may be made to prime the gas valve 8. 49 in Fig. 4 is the neutral point of a double cam for operating the gas valve 8; in the neutral step 49 there is no movement of the tappet 25, that section of the cam being circular, and through it the gas valve 8 will not move. 50—50′—50″ and 50‴ are successive steps for the motion of the engine in one direction and 51—51′—51″ and 51‴ are similar steps set opposite the first series to be used for the reverse direction. For example, the step 50 will give a very slight lift and hold the gas valve open for about 60°, the step 50′ has a little more lift and works through 75°, the step 50″ has still more lift and works through 90°, and the last step 50‴ gives the maximum lift and keeps the gas valve open for 105°. The lead of all steps of the cam will be constant at about 15° in advance of the center so that the earliest cut-off will be when the engine crank is 45° past the upper center and the latest cut-off will be 90° past the center.

In Fig. 5 is shown an enlarged section of the engine which includes the valve cage 10, the air valve 6 and the main part of the gas valve 8. It also shows the fuel chamber 11 and the fuel check valve 12. In this view the valves are shown in their position at that point of the compression stroke where the air valve 6 opens automatically to admit air from the cylinder to the air receiver 5. At this period the gas valve 8 is seated, closing its ports 9 and sealing the gas chamber 9′ which is still receiving fuel through the fuel check valve 12 and the fuel chamber 11, to which the pump 35 is delivering it. The outer side of the barrel of the air valve 6 is shown to be grooved longitudinally. This is to provide for balancing the pressure on that valve so it will not have a tendency to stay open or be forced into the recess which holds the spring 7; the outside of the barrel of the chambered gas valve 8 and the outside of the inner part of the cage 10 are shown to have radial grooves as is also the stem of the gas valve in Fig. 1. These radial grooves will be filled with a suitable packing to prevent leakage of air from the air receiver 5 to the cylinder or gas chamber 9′.

In Fig. 6 three cylinders are shown which are similar to the cylinder shown in the preceding figures. All are mounted on a common base and their pistons are operated by a common shaft with the cranks set 120° apart.

A common cam shaft 23 carries the three double cams and one controller 40 takes care of their setting. One lay shaft 32 carries the fuel cams for the three pumps which are timed to begin the delivery of the fuel charge as soon as the gas valve 8 is seated, thereby allowing plenty of time, if the fuel be a liquid, for it to withdraw heat from its surroundings and become a gas under pressure. In this figure the air receiver 5′, instead of being in the head of the cylinder as in the preceding figures, is placed along the side of the cylinders and forms an inter-communication between them, but with the valves 6 and 8 interposed in the passages leading to the cylinders. This receiver 5′ has the same capacity as for one cylinder. These valves are so timed by the cams 24 that only one cylinder at a time may be in communication with the air receiver, and they are so set that one cylinder cannot fire back into another cylinder.

52 is the outer casing of a form of positive blower or rotary air pump, which may take the form of any of the approved machines of this class now in common use. No details of its inner construction are shown. This air pump 52 replaces the crank case pumping action which is commonly used on the so-called two-stroke engines, and delivers air under slight pressure through the common passage 53 to the ports 16 of each cylinder and discharges through these ports to the cylinder when the piston uncovers them at the end of its work stroke. This pressure, which is commonly called "pre-compression pressure," is sufficient to thoroughly scavenge the cylinder of the products of the previous combustion and leave the cylinder filled with pure air.

54 is a storage valve which is operated by a rod 55, which in turn is operated by a projection 56 on the cam shaft 23. This projection is so placed that it will not open the valve 54 except when the cams are at their neutral point when the gas valve 8 and the fuel pump 35 are not working. This arrangement is necessary for two reasons. First, while the engine is operating under its own power, the compressed air should be confined to the receiver 5′; second, when power is shut off and the engine continues to turn over, it then becomes an air compressor and must have a vent for the air pumped.

In Fig. 1, the safety valve 20 allows it to discharge to the atmosphere when it reaches the danger point, but in practice this energy will be stored up. For this purpose, air tanks are provided in any convenient position. In Fig. 6 they are shown as tubes 57 connected together at 58 by a small tube and are made to serve also as a sub-frame for the engine. Leading from this storage valve 54 is the tube 59 ending at the air tank in a check valve 60 which is set to retain the air in the tanks.

In order to utilize this storage air, a supply valve 61 will be placed as shown at the other end of the receiver 5′. This valve is connected to the air tank by another tube 62 which terminates in a check-valve 60′.

This check-valve is set opposite to the check-valve 60, as its purpose is to allow air to flow to the receiver 5′ and to return to its seat when the pressures are balanced, so that any rise in pressure in the receiver will not cause a flow to the tank.

This valve 61 will be opened and closed by hand, and its purpose is to fill the receiver with air under pressure after the engine has been idle for a long time and will lose pressure by lowered temperature and possibly by leakage. This supply valve 61 may be closed as soon as the receiver is filled before starting the engine, or it may remain open and allow the tube 62 to become a part of the receiver. By this plan of working, the air tanks become auxiliary to the air pumped by the pistons and bring the whole engine more nearly to the perfect constant pressure cycle. So long as this valve 61 remains open, the pistons will work under a pressure never less than that of the air tanks, and by the closing action of the check-valve 60′, pressures due to the compression stroke of the engine and to combustion of the fuel will be permitted to rise far above it. The effect of this method of working on the reserve air supply will be to gradually lower the pressure in the tanks until the pumping action of the pistons is capable of supplying the demand when the check-valve 60' will remain permanently closed. The lowest pressure possible in this engine without any combustion would be about 30 lbs. per sq. inch absolute pressure with cut-off at one-half the stroke, which is the latest point contemplated. With cut-off at one-fourth the stroke the pressure would rise to 45 lbs., and so on. If fuel is being burned, the air in the cylinder will be expanded to the exclusion of air from the receiver or tanks, and the result will be a gradual building up of pressure in the receiver. It will be seen that this building-up process has a safe limit, since high pressures are attended by high velocities, so that the gas valve and air valve acting together as they do would be able even at very early cut-off to discharge as much air as the piston will put into the receiver, when, of course, the maximum pressure would remain stationary, as long as the fuel supply also remained stationary. My invention contemplates in its fullest form the employment of all apparatus shown in Fig. 6, which includes a small auxiliary air compressor 63 connected to the air tanks 57 by the pipe line 64 with a suitable check-valve 65 next to the tank.

It will be noted that under normal conditions and with proper attention to the point of cut-off and fuel supply the pistons are amply able to supply the necessary air at high pressure without calling on the reserve air, and at no time will the reserve air be required to be more than supply any slight deficit which would be caused by starting or running in full gear with insufficient fuel. Therefore, the small auxiliary air compressor may be made to work automatically to maintain the desired tank pressure which need never be more than two hundred pounds per square inch. It will be remembered that even if the auxiliary air system were disabled and the working confined to the simple receiver, absolutely satisfactory results would be obtained if ordinary care was used in fixing the proper point of cut-off and supplying the correct amount of fuel. Two points on which considerable stress is laid are the ability to burn even the smallest amount of fuel, since only a small amount of air is in contact with the gas and that at a high temperature, due to the high compression used, and the economy possible, particularly on motor-driven vehicles or railway cars, by shutting off the fuel altogether when coasting, and by the utter absence of any necessity for the engine to be operating when the vehicle is standing idle.

A result of the adoption of my engine to motor-driven vehicles or railway cars will be found in its perfect action (when descending a hill or stopping) as an air brake. It has already been pointed out that with the fuel shut off and the car coasting, the engine becomes an air compressor with terminal pressures eventually possible that would stop the car as quick as traction with the road would admit.

The controller 40, under this condition, becomes an air controller. By setting it at full stroke the car will coast with comparative freedom, since the compressed air gives back most of the power consumed in compressing it, but as the point of cut-off is made earlier the resistance becomes greater until finally, when the controller is set at the neutral point scarcely any of the energy will be given back so that the receiver would tend to burst from the accumulated pressure. Long before this could happen, however, the wheels would probably slide or the safety valve would open. The engine is therefore proof against serious accident.

The indicator diagram shown in Fig. 7 may properly be called a probable diagram, since it is drawn from calculations of an engine of assumed dimensions. It is sufficiently accurate, however, to serve as a basis for a description of the method of operation.

I have used letters instead of figures as a means of tracing out the different phases of the cycle.

The engine on which this probable diagram is based is assumed to have a bore of five inches and a stroke of six and one-half inches and to turn over at the rate of eight hundred revolutions per minute.

The cycle is confined to that action which would come from the receiver only, and with a moderate charge of fuel. It does not contemplate any air from the storage tanks. I have used for the calculation of the curves the formula $PV^{1.3}=C$ or pressure times (volume raised to the 1.3 power) equals a constant. During the period of combustion, or from the beginning of the work stroke to the point of cut-off (which is here assumed to be at one-fourth of the piston stroke), I have introduced as near as may be the effect of this combustion on the contained gases. It will be noted that the diagram does not indicate an explosion in the cylinder, for it will be remembered that there is really no explosive mixture. Therefore, as previously pointed out, combustion only takes place as the piston replacement allows a flow of air and gas to the cylinder, the mixture forming and burning continuously during the period of admission with great rapidity in the highly heated and dense atmosphere. (A result of the method is found in the instantaneous ignition of the charge from the high heat obtained by compression, which makes the use of ignition devices unnecessary, except for starting the engine cold.)

In the figure A is represented the point where compression begins, which is immediately after the exhaust ports 17 in Fig. 1 have been covered by the piston and about 15 per cent. of the stroke counted from the inner dead center.

The cylinder is at this point filled with pure air at a pressure of fourteen pounds absolute.

(All pressures referred to herein are absolute pressures.)

At this stage the chambered gas valve 8 and the automatic air valve 6 (shown in Fig. 1) are seated; the air valve holding the pressure in the receiver, which is assumed to be 200 lbs. per sq. in., and the gas valve receiving its charge of fuel which instantly withdraws heat from the valves and their seats, thereby cooling them and changing itself into a gas under pressure due to its change of volume.

(I am here considering the use of a moderate charge of liquid fuel,—a low grade distillate of petroleum, for example.)

Now, following the piston on its compression stroke we find at B (which is about 87% of the piston travel) the pressure has risen to 200 lbs. per sq. in.—that of the receiver. Now, the pressures become unbalanced and the automatic air valve 6 opens.

Bear in mind that up to this point the constant C has been based on a pressure of 14.8 lbs. and a volume equal to the total space swept by the piston, plus the very small clearance in the cylinder, the port 3 and the valve pocket 3'. From B, however, a new set of conditions are introduced, so that we must find a new constant based on a pressure of 200 lbs. and a volume equal to the remaining space to be swept by the piston (=13% of the total space swept), the small clearance in the cylinder, the port, the valve pocket and the receiver.

The flattening of the compression curve from B shows graphically the effect of adding the volume of the receiver which is itself equal to approximately 25% of the space swept by the piston.

From B then the pressure rises more slowly to D at the end of the stroke, when the gas valve 8 is caused to open and combustion begins.

At this point D the diagram indicates 424 lbs.

The gas is now entirely surrounded by pure air at a high pressure and temperature, but not mixed with it. If the engine were stopped at this point, nothing would happen except, perhaps, a small flame where the gas and air come into contact. This would only drive the gas farther into its chamber in the gas valve and the flame would go out for want of supporting atmosphere.

Let us suppose that the engine has been stopped just a little over the center, and that the flame becomes extinguished, but the gas, or nearly all of it, is still in the gas chamber, and both air and gas are still highly heated.

Now, if the engine were released, the air pressure would start the piston down, and at the first movement gas and air would rush together to occupy the space vacated by the piston and combustion would be resumed.

We will proceed with the cycle from D as if the engine had not been stopped, and we find that the heat of combustion during the early part of the stroke is holding up the pressure so that no more air is flowing to the cylinder from the receiver than is needed to support combustion. At the point of cut-off, at E, which is 25% of the work stroke, we find the pressure slightly more than 200 lbs. From E to F, at which latter point the piston uncovers the exhaust ports 17, the remaining gas is burned and expanded to approximately 40 lbs. absolute pressure or about 25 lbs. above the atmosphere. From F to G at the end of the stroke and from G to A the burned products flow out and are expelled by the incoming fresh air, which latter operation begins approximately at G, and the cylinder is again filled with pure air ready to repeat the process.

As previously stated, only a moderate charge of fuel is contemplated in the diagram and with cut off at one fourth of the work stroke, at a pressure of 200# per square inch as shown by the full lines. If the fuel charge should be increased to the maximum and the point of cut-off made at one half of the work stroke, the combustion and expansion curve would take approximately the form shown by the broken line from D to E'—the point of cut-off—and from E' to F' where the exhaust begins at about 75#, ending at G at about atmospheric pressure. This curve shows the combined effect of adding fuel and making the point of cut-off later. In fact, at 40% of the work stroke all or nearly all of the fuel would be in the cylinder so that if the point of cut-off were made here 300# of air would be trapped in the receiver and a terminal pressure of 550# to 575# would result upon completion of the next compression stroke and an entirely new diagram would result. Under this condition of cut-off at 300# the compression curve A B would be continued until it reached 300# as at B', where the automatic air valve would open communication with the receiver and the pressure would rise more slowly to the terminal pressure at 550 to 575#, as before stated but not shown on the diagram for want of space. These curves show that there is no necessity to call on the auxiliary air tanks to support combustion or to maintain any desired pressure in the receiver at the point of cut-off. Their real function is to supply air to the receiver under pressure after a long shut down.

Let us suppose however that a very small amount of fuel is used and that the auxiliary air is brought into play, then the combustion and expansion curve would take approximately the form shown by the dotted line from D to E″ and drawing on the auxiliary air from E″ to E to maintain the pressure of 200# up to the point of cut-off at E. This curve contemplates an outside source of supply such as the small air compressor 63 shown in Fig. 6 to keep up the pressure in the auxiliary air tanks. The proper way however to manipulate the engine would be to make the point of cut-off at 20% of the work stroke, which would leave the desired 200# pressure in the receiver and the curve would develop from E″ to F″ exhausting at about 25# absolute pressure. If this precaution of changing the point of cut-off is not taken where a small fuel charge is used and no auxiliary air is provided, the point of cut-off at say one fourth of the work stroke would show only about 165# in the receiver as at E‴. On the next compression stroke the terminal pressure as at D′ would be lowered to about 350#. The ensuing combustion phase of the cycle would be less powerful on account of lack of density and heat of compression and the curves would gradually fall off until perhaps no more than 250# would result in the receiver at the end of the compression stroke. The attendant lowered temperature then might not be sufficient to cause automatic ignition. A terminal pressure of 200# is however, about as low as would be obtained with cut-off at one fourth of the stroke even if no fuel were added and the engine was being turned over by some outside force.

These modifications of the diagram are introduced to show the wide range of power the method is capable of developing and the extreme flexibility of the controls. A great variety of running conditions may be found by setting the fuel supply at say full load and then varying the point of cut-off; or, leave the point of cut-off stationary and vary the fuel supply; or, more correctly, change both the fuel supply and the point of cut-off to obtain the best and most economical running condition. It will be seen that a setting of the fuel supply and point of cut-off can readily be found for any fuel no matter what its heat value may be and that maximum pressures may range anywhere from 200# to possibly 600# at the will of the operator.

It will be seen from the foregoing that the engine is truly a constant pressure engine with continuous combustion up to the point of cut-off, and appears to be capable of duplicating any action of which the steam engine is capable. Its starting torque and capacity for overload, should be much greater than the types now in common and extensive use. Its economy promises to be superior on account of the method employed; heat energy has been conserved as far as it seems possible in an internal combustion engine. I cause combustion to take place in the cylinder (this is in marked contrast to the several types of continuous combustion apparatus which have the same object in view. My method does not permit any material heat losses in transit.) I have conserved the heat of compression by placing the receiver close to the combustion chamber and with water pockets only where they are needed to preserve the form of the valves and their seats. It is the location of this air and the separate gas chamber and receiver and the means which I have provided for the control of both air and gas that makes the engine what I claim for it.

What I claim as my invention is:

1. In an internal combustion engine the combination with a cylinder of a chamber separate from but adjacent to said cylinder, a passage connecting said cylinder and chamber, a valve controlling said passage, permitting the admission and trapping in said chamber of a volume of air compressed in said cylinder, a valve controlling the admission of fuel into said cylinder, and variably adjustable means for simultaneously opening said valves during a portion of the working stroke.

2. In an internal combustion engine the combination with a cylinder of a chamber separate from but adjacent to said cylinder, a passage connecting said cylinder and chamber, a valve controlling said passage, permitting admission and trapping in said chamber of a volume of air compressed in said cylinder, a valve concentrically arranged within said first-mentioned valve controlling the admission of fuel into said cylinder, and means for simultaneously opening both of said valves during a portion of the working stroke to admit and commingle proportionate quantities of compressed air and fuel.

3. In an internal combustion engine the combination with a cylinder of a chamber separate from but adjacent to said cylinder, into which successive full cylinder volumes of air compressed in said cylinder are admitted and trapped to produce accumulative pressure, means permitting a portion of the trapped volume to return to said cylinder during the working stroke, a chamber in which successive charges of fuel are trapped and gasified by the internal heat of the engine, and means for opening said latter chamber during a period in which the air chamber is open.

4. In an internal combustion engine the combination of a cylinder, a piston operating in said cylinder with its clearance space reduced to the minimum, a chamber at the end of said cylinder, separated therefrom, a passage for connecting said cylinder and chamber, a valve controlling said passage adapted to automatically open for the passage of air compressed in said cylinder into said chamber, a valve for admitting fuel to said cylinder arranged concentrically within said air valve, and timed mechanical means for simultaneously opening said valves and for cutting off at varying points in the working stroke.

5. In an internal combustion engine the combination with a cylinder, of a chamber adjacent to said cylinder, a passage connecting said cylinder and chamber, a valve controlling said passage, yieldably permitting the admission and trapping in said chamber of a volume of air compressed in said cylinder, a valve controlling the admission of fuel into said cylinder, adapted to actuate said first-mentioned valve, a tappet adapted to operate said fuel controlling valve, and a longitudinally adjustable stepped-cam engaging said tappet.

6. In an internal combustion engine the combination with a cylinder, of a chamber adjacent thereto, means for admitting and trapping in said chamber a volume of air compressed in said cylinder, a fuel supply, valves for permitting the passage of fuel and compressed air into said cylinder, an adjustable means for variably operating said valves, and connections between said adjustable means and fuel supply for supplying a quantity of fuel proportional to that of the compressed air.

In testimony whereof I affix my signature in presence of two witnesses.

CHARLES D. McCLINTOCK.

Witnesses:
    JAMES P. BARRY,
    DELBERT COLLINS.